(12) United States Patent
Moreau

(10) Patent No.: US 9,884,523 B2
(45) Date of Patent: Feb. 6, 2018

(54) METHOD OF UTILIZING A SYSTEM FOR MONITORING THE PRESSURE AND/OR THE TEMPERATURE OF THE TIRES OF A VEHICLE AND DEVICE ALLOWING IMPLEMENTATION

(71) Applicant: LDL Technology S.A.S., Ramonville Saint Agne (FR)

(72) Inventor: Thierry Moreau, Balma (FR)

(73) Assignee: LDL TECHNOLOGY S.A.S., Ramonville Saint Ange (FR)

( * ) Notice: Subject to any disclaimer, the term of this patent is extended or adjusted under 35 U.S.C. 154(b) by 0 days.

(21) Appl. No.: 15/023,933

(22) PCT Filed: Oct. 9, 2014

(86) PCT No.: PCT/FR2014/052559
§ 371 (c)(1),
(2) Date: Mar. 22, 2016

(87) PCT Pub. No.: WO2015/052439
PCT Pub. Date: Apr. 16, 2015

(65) Prior Publication Data
US 2016/0236523 A1 Aug. 18, 2016

(30) Foreign Application Priority Data
Oct. 11, 2013 (FR) ...................................... 13 59880

(51) Int. Cl.
*B60C 23/04* (2006.01)
*B60C 23/02* (2006.01)
(Continued)

(52) U.S. Cl.
CPC ........ *B60C 23/0415* (2013.01); *B60C 23/008* (2013.01); *B60C 23/009* (2013.01);
(Continued)

(58) Field of Classification Search
USPC ....................................................... 701/33.1
See application file for complete search history.

(56) References Cited

U.S. PATENT DOCUMENTS 5,109,213 A * 4/1992 Williams .............. B60C 23/007
200/61.22
6,043,738 A * 3/2000 Stewart ............... B60C 23/0416
340/442
(Continued)

FOREIGN PATENT DOCUMENTS

DE 102010062058 A1 5/2012
EP 1769948 A2 4/2007

OTHER PUBLICATIONS

Simin Baharlou, Preliminary International Report on Patentability, PCT/FR2014/052559, International Bureau of the World Intellectual Property Organization, Apr. 12, 2016, 1-7.

*Primary Examiner* — Tyler J Lee
(74) *Attorney, Agent, or Firm* — Paul & Paul

(57) ABSTRACT

The invention relates to a method of utilizing a system for monitoring the temperature and/or the pressure of the tires of a vehicle (C) comprising one or more rolling sub-assemblies (100, 200), noteworthy in that it consists in installing on each rolling sub-assembly (100, 200), an additional storage and communication module (300') comprising: —a data storage means in which are recorded, during a learning phase, the set of unique identifiers and the locations of each measurement and communication pick-up module (300) of said rolling sub-assembly (100, 200), —a means of communication at least with the reception and transmission modules (400) and installed on the rolling sub-assembly, —a means of storing energy for the purposes of powering the communication means, so that said storage and communication module (300') can retain in memory the set of identifiers and associated locations of the same sub-assem- (Continued)

bly (100, 200) and can communicate it instantaneously. The invention also relates to the device allowing the method to be implemented. Applications: utilization of a system for monitoring tires.

20 Claims, 2 Drawing Sheets

(51) Int. Cl.
  *B60C 23/00* (2006.01)
  *B60C 23/20* (2006.01)
(52) U.S. Cl.
  CPC ............ *B60C 23/02* (2013.01); *B60C 23/044* (2013.01); *B60C 23/0416* (2013.01); *B60C 23/0442* (2013.01); *B60C 23/0461* (2013.01); *B60C 23/0474* (2013.01); *B60C 23/0476* (2013.01); *B60C 23/0479* (2013.01); *B60C 23/0486* (2013.01); *B60C 23/20* (2013.01)

(56) References Cited

U.S. PATENT DOCUMENTS

| | | | | |
|---|---|---|---|---|
| 7,075,419 B2* | 7/2006 | Watabe | ............... | B60C 23/007 340/442 |
| 7,336,163 B2* | 2/2008 | Fujii | ............... | B60C 23/0408 340/10.31 |
| 7,454,966 B2* | 11/2008 | Fujioka | ............... | B60C 23/0408 73/146.5 |
| 7,508,302 B2* | 3/2009 | Watabe | ............... | B60C 23/0416 340/438 |
| 7,924,147 B2* | 4/2011 | Mathias | ............... | B60C 23/0416 340/442 |
| 8,686,847 B2* | 4/2014 | Lickfelt | ............... | B60C 23/0418 116/34 A |
| 8,935,069 B2* | 1/2015 | Zula | ............... | B60C 23/0433 340/438 |
| 9,350,468 B2 | 5/2016 | Bettecken | | |
| 2002/0130771 A1* | 9/2002 | Osborne | ............... | B60C 23/005 340/438 |
| 2005/0289019 A1* | 12/2005 | Chan | ............... | G06K 17/00 705/28 |
| 2006/0276991 A1* | 12/2006 | Watabe | ............... | B60C 23/007 702/138 |
| 2006/0279416 A1* | 12/2006 | Watabe | ............... | B60C 23/007 340/447 |
| 2007/0069877 A1* | 3/2007 | Fogelstrom | ............... | B60C 23/005 340/442 |
| 2008/0133081 A1* | 6/2008 | Colarelli | ............... | B60C 23/0408 701/29.2 |
| 2009/0058626 A1* | 3/2009 | Watabe | ............... | B60C 23/0416 340/447 |
| 2009/0085734 A1* | 4/2009 | Gila | ............... | B60C 23/007 340/447 |
| 2009/0088939 A1* | 4/2009 | To | ............... | B60C 23/0416 701/72 |
| 2009/0207010 A1* | 8/2009 | Huang | ............... | B60C 23/007 340/447 |
| 2011/0071737 A1* | 3/2011 | Greer | ............... | B60C 23/0416 701/49 |
| 2011/0313623 A1* | 12/2011 | Greer | ............... | G06F 11/30 701/49 |
| 2012/0029767 A1* | 2/2012 | Bailie | ............... | B60C 23/0416 701/36 |
| 2013/0145835 A1* | 6/2013 | Ji | ............... | B60C 23/0488 73/146.5 |
| 2015/0057876 A1* | 2/2015 | Graham | ............... | B60C 23/0416 701/33.4 |

* cited by examiner

METHOD OF UTILIZING A SYSTEM FOR MONITORING THE PRESSURE AND/OR THE TEMPERATURE OF THE TIRES OF A VEHICLE AND DEVICE ALLOWING IMPLEMENTATION

CROSS-REFERENCE TO RELATED APPLICATION

This application is a 371 national stage application of International Application PCT/FR2014/052559, filed Oct. 9, 2014, and claims the priority of French Application No. 1359880, filed on Oct. 11, 2013.

FIELD OF APPLICATION OF THE INVENTION

This invention relates to the field of systems for monitoring the pressure and/or the temperature of the tyres of a vehicle and to the adaptations making it possible to carry out in particular the learning and the location of sensors associated with the wheels of the vehicle in the best conditions.

DESCRIPTION OF PRIOR ART

Conventionally, a system for monitoring the temperature and/or the pressure of the tyres of a vehicle comprises the following sub-assemblies:
- measurement pick-up and communication modules associated with each wheel,
- one or several reception and transmission modules of information coming from the measurement modules and arranged on the axle or the chassis,
- a means of display and management available in the cab for the driver and communicating with said reception and transmission modules.

The communication is carried out according to a range of frequencies in kilohertz referred to as LF (low frequencies) or according to a range of frequencies in megahertz referred to as RF (radio frequencies).

Each measurement module has a unique identifier number allowing it to be identified among the other modules of the vehicle and of other vehicles. Each measurement module can as such be identified by the reception module.

For lorries and multi-wheel vehicles, the user has to know the wheel which is lacking in pressure in order to launch maintenance as quickly as possible. It is in particular important to know if the tyre defect is to be attributed to the trailer or to the tractor, which will not have the same consequence on the management of the fleet of vehicles.

It is therefore very important to know the exact location of each measurement module. A so-called learning phase wherein each unique identifier is associated with a location, is therefore required.

Many learning strategies exist for automobiles with four wheels, with the device knowing how to locate for example the drive wheels via the difference in temperature of the tyres providing the traction, and also differentiate the left from the right by means of accelerometers integrated into the measurement pick-up modules.

Other strategies use receptive antennas built into each wheel passage in order to receive the unique identifier from the measurement module of the wheel managed by this antenna. The problem with such a solution resides in the cost and in the complexity of the installation when it is a question of equipping for example the eighteen wheels of a heavy goods vehicle. An example of implementing such a strategy is described in document DE102010062058 which proposes a method and a device for measuring a LF (low frequencies) field of a LF transmitter. It also describes a method for arranging a LF transmitter to transmit a LF signal to a LF receiver installed in the tyre of a vehicle and/or to arrange a RF receiver. The data representing the intensity of the LF signal and the position of the LF receiver are stored. Nevertheless, this storage has for purpose to retain in memory on the vehicle what was able to be established by the learning phase. When the vehicle has a wheel change or is associated with another rolling sub-assembly, another learning phase is required. In fact, this learning is conventionally carried out manually by an operator who must walk around the lorry and the trailer with a computer in order to obtain unique identifiers of each measurement module for each wheel and in order to declare them with their location to the reception and transmission module. This operation is tedious and in theory must be carried out at each change of trailer.

DESCRIPTION OF THE INVENTION

The applicant therefore conducted research aiming to optimise the learning operation by proposing a solution that is simple and inexpensive.

This research resulted in the design and in the implementation of a method of operation of a system for monitoring the temperature and/or the pressure of the tyres of a vehicle comprising one or more rolling sub-assemblies, said system including the following sub-assemblies:
- measurement pick-up and communication modules associated with each wheel,
- one or several reception and transmission modules of information transmitted in radio frequencies (RF) by the measurement pick-up modules and arranged on the axle or the chassis,
- a means of display and management available in the cab for the driver of the vehicle and communicating by wired network or in radio frequencies (RF) with said reception and transmission module or modules.

This method is noteworthy in that it consists in installing on each rolling sub-assembly, an additional storage and communication module comprising:
- a data storage means in which are recorded, during a learning phase, the set of unique identifiers and the locations of each measurement pick-up and communication module of said rolling sub-assembly,
- a means of communication emitting in radio frequencies (RF) and receiving in low frequencies (LF) communicating at least with the reception and transmission module or modules,
- a means of storing energy for the purposes of powering the communication means, in such a way that said storage and communication module can retain in memory the set of identifiers and associated locations of the same rolling sub-assembly and can communicate it instantaneously.

The presence of this additional communication module will not only facilitate the learning operation but also pairing.

Indeed, it is interesting to pair the tractors and the trailers in order to increase the rapidity of the learning of the system, i.e. the reception and transmission modules know how to identify all of the measurement pick-up modules of the hitch in a minimum amount of time. This pairing prevents reproducing the operation carried out by the operator each time the hitch is changed. As such, the method of the invention applies more particularly to vehicles comprising several rolling sub-assemblies able to be separated. To do this, the method of the invention proposes to provide the tractor and the trailer or trailers with the additional storage and communication module.

To do this, according to a preferred embodiment, the method proposes that an operator provided with a portable interrogation module (trigger) interrogates each measurement module associated with each wheel of the same rolling sub-assembly. This interrogation can be carried out in low frequencies (LF) from the interrogation module to the measurement module and in radio frequencies (RF) from the measurement module to the interrogation module. This interrogation module stores in memory the locations of each measurement module of the rolling sub-assembly. These locations associated with the unique identifiers read are then transmitted to the additional storage and communication module associated with the chassis of said rolling sub-assembly which will store them.

This operation is carried out only one time and makes it possible to have a module that constantly knows the location and the unique identification of each measurement module carried by the rolling sub-assembly. The means for supplying energy, by providing the module with operating autonomy, will in addition allow for the making available of this information even when the vehicle is not running (ignition switch not activated). These storage and communication modules constantly emit at regular intervals or when events are detected such as the movement of the rolling sub-assembly.

Such a making available constitutes major progress with regards to the conventional reception and transmission network which was active only when the vehicle was running.

When the system is turned on for monitoring, the reception and transmission modules will receive the information grouped and stored in the storage and communication modules.

The reception and transmission modules then instantaneously receive the location of each measurement module on the rolling sub-assembly. This information is then sent directly or from one reception module to the other to the display and management module of the driver or directly via remote transmission to the manager of the fleet via a satellite or land communication network.

This learning mode therefore prevents any untimely connection to the multiplexed bus (CAN for example) of the vehicle via the diagnostic interface by means of a computer or portable interrogation module. It also ensures that the operation will have to be carried out only one time during the equipping of the vehicle by the system for monitoring or when there are permutations/changes of wheels.

Another advantage of such a configuration resides in the inter-communicability of the reception and transmission modules during the junction of the rolling sub-assemblies. Indeed, for example during the changing of a trailer, the data stored by the additional storage and communication modules of each sub-assembly is immediately transmitted by the reception and transmission modules and the pairing configuration of the new vehicle is instantaneously known by the display module and by the manager of the fleet (remotely).

This favoured transmission can apply to all of the information contained in the data storage means. In addition, the association of the additional storage and communication module with a reception and transmission module will be used as a gateway to any type of information and data able to come for example from a portable electronic interrogation module and this, regardless of the quantity of data. Indeed, the quantity can exceed that able to be stored by the storage module due to the fact that it is immediately transmitted.

According to another particularly advantageous characteristic, the method consists in associating to said storage and communication module, a means for detecting movement of the rolling sub-assembly for the purposes of triggering the emission of the data stored by the means of storage and communication only once the movement is detected. This method prevents the disadvantages of shadow areas, i.e. when two vehicles are parked next to one another and one of them is in learning phase, it is preferable that the storage and communication modules of the vehicle that have already carried out their learning are silenced and do not disturb the learning in progress.

Whether or not triggered by the detection of movement, another characteristic consists in comparing by means of the reception and transmission module, the data coming from the measurement modules with the data coming from the means of storage and communication. Indeed, as explained hereinabove, the reception and transmission module can carry out this verification, once the vehicle has exited any shadow area. Of course, a difference between the information stored and that directly emitted by the measurement pick-up modules has for consequence the sending of a message of a lack of updating of the storage and communication modules and therefore of a message to the manager of the fleet that a maintenance operation has been carried out.

In order to implement such an update, the storage and communication module can be arranged in the vicinity of the reception and transmission module which then comprises a means of communication in low frequencies (LF) which makes it possible to update the data stored in the storage module simultaneously or during the first movement of the vehicle following the wheel change.

According to another particularly advantageous characteristic, the method is noteworthy in that it consists in associating with said storage and communication module, a means for measuring the pressure and/or the temperature. This characteristic adds an additional functionality to the storage and communication module.

As such, according to another characteristic, the method consists in positioning said storage module provided with the measurement pick-up means, outside of the rolling sub-assembly in order to know the temperature of the outside ambient air for the purposes of correcting via compensation the measurements taken in the tyres by the measurement pick-up and communication modules.

Indeed, the modules for taking measurements of the pressure and/or of the temperature use sensors of which the parameters measured depend largely on a reference to an ambient temperature which is usually set to 20 degrees Celsius. However, this ambient temperature can vary substantially during the day or according to the travel of the vehicle (plain, mountain, etc.). These differences in ambient temperature and therefore in pressure can, thanks to the invention, be taken into account by the method of the invention in order to correct the parameters measured and to optimise the expenses linked to the vehicle (overconsumption of fuel, premature wear of the tyres, etc.).

According to another characteristic, the method consists in positioning said storage and communication module provided with the measurement pick-up means inside the useful volume of the rolling sub-assembly. It is then possible to arrange all of the functionalities of the storage module while still monitoring for example the temperature of a refrigerated chamber.

According to another particularly advantageous characteristic, the method consists:

in measuring the power of the signal received by the reception and transmission module or modules and sent by the storage and communication modules, and in knowing the distance that separates the storage and communication modules and the reception and transmission modules, in order to calibrate the intensity of the signal emitted by said reception and transmission module or modules in order to render more accurate the location of the measurement pick-up modules by measuring the intensity of the signal emitted by the latter.

It is indeed known to provide a location of the measurement pick-up modules in particular on twinned wheels by variation and measurement of the intensity of the signal. Such a measurement requires the highest degree of precision possible as to the knowledge of the signal received by the reception and transmission module.

The presence of these storage and communication modules as such makes it possible to calibrate in signal intensity (RSSI), the reception modules.

According to another particularly advantageous characteristics of the invention, the method consists in receiving, by means of the reception and transmission module, the signals of storage and communication modules of other rolling sub-assemblies and in emitting an alert on the display and management module in order to prevent any contact. Based on the continuous emission of the storage and measurement pick-up modules powered independently, with the storage modules having, according to a preferred embodiment, an open field range of about 15 meters which allows for remote detection by the reception and transmission modules of other vehicles. As such, the system for monitoring can, for example, emit a proximity alert message with respect to another lorry which would be in a blind spot during a manoeuvre in reverse. In order to implement such a characteristic, the reception and transmission module is provided with a means of communication in low frequencies (LF). During operation in reverse, the electronics network (CAN) of the vehicle transmits to the reception module, the reverse operation information which activates the storage module which can then operate as a reverse radar.

According to another characteristic, the method consists in receiving, by means of a reception and transmission module, the signals of storage and communication modules associated with fixed structures. As such, a storage and reception module can be installed on a dock in order to warn the system of the lorry and therefore its driver that the latter is approaching a critical distance from the dock.

According to another characteristic, the method consists in recording for the purposes of identification in the data storage means, data relative to one or several of the following objects rolling sub-assembly,
vehicle,
user,
owner.

For example, the information linked to the vehicles can relate to its characteristics such as its length, its height, its weight which can be used in order to assist with manoeuvres in reverse, ensuring passage under bridges or the compatibility of the trailer with the tractor.

This information can also be used to manage and monitor the fleet of vehicles present on a parking area.

Likewise, according to another characteristic the method consists in recording in the data storage means, the data relative to maintenance, road activity history or data measured.

Each rolling sub-assembly can as such transport and make available in a memory that can be consulted, various pieces of information such as:

the last maintenance intervention (on the tyres but also on other parts of the vehicle),
road activity history of the tachograph type which can be controlled by the detection of movement,
the history of the temperatures/pressures measured in particular those of the ambient air,
etc.

According to another particularly advantageous characteristic of the invention, the method consists in recording in the data storage means a confidential code transmitted to the final client receiving the merchandise. The storage and communication module or modules then serve as a means of authentication certification attached to the monitoring of a delivery. As such, according to this method, the shipper during the loading of a trailer or of a container can record a confidential code in the storage module. This code is transmitted in a confidential manner to the end customer who has to receive the cargo. This final customer can carry out a monitoring of his trailer via the built-in telematic applications (for example: satellite location of the GPS type of the trailer identified with the identifier of the storage module). In this way, the client can estimate the arrival time of the load allowing him to better organise his logistics flows.

In addition, when the trailer arrives at the dock, the customer has the possibility of validating the proper reception of the goods by communicating (using a portable interrogation module at low frequencies for example) with the storage module. The customer enters his confidential code into the storage module, which authenticates the proper reception of the goods transported and advantageously replaces the hand-written signature on an electronic terminal that the receiver has to carry out today, with this signature not guaranteeing the identity of the receiver. The storage module communicates in real time, via the built-in telematics, the proper reception of the goods. Customer satisfaction information on the goods received can also be encoded and transmitted via this method.

Another object of the invention relates to the device making it possible to implement the method described hereinabove. According to a particularly advantageous characteristic, said storage and communication module is constituted by an additional measurement module that groups together the same functionalities as those of the measurement pick-up modules of the wheels and is fixed to the chassis of the rolling sub-assembly. As such, according to this characteristic the storage and communication module is constituted by an additional measurement pick-up and communication module which will be installed on each rolling sub-assembly and of which the data storage means will serve to record all of the location and unique identifier data of the measurement pick-up modules housed in the wheels.

In addition, the measurement pick-up means will allow for the implementing of the method consisting in taking into account the outside ambient temperature.

Another advantage resides in the possibility of monitoring the temperature of refrigerated trailers, by positioning said device not outside of but inside the refrigerated chamber in accordance with one of the characteristics of the method described hereinabove.

Another advantage resides in the fact that the storage and communication module is then powered continuously by its own battery as the measurement pick-up modules and allows for the configuration of the system without the rolling sub-assembly having to be powered up.

This device as such makes use of a means known of the system for monitoring but with a function that is different from those of taking measurements in the tyre and the storing of a unique identifier. Indeed, the memory is used to store the set of locations and associated identifiers of the rolling sub-assembly and the sensor is used (possibly) to know outside or inside parameters but outside of the tyres.

In addition, the reverse radar functions described hereinabove in one of the characteristics of the method and which require a more substantial antenna range, are made possible due to the fact that such a module is now located outside and not inside a tyre.

Likewise, the storage functions of data in addition to that usually stored are made possible due to the fact that such a module is released from other functions.

As such, for example, the storage means provided on the measurement pick-up modules able to communicate with RFID chips associated with each tyre is sufficiently sized in order to contain the set of identifiers and the locations of the measurement pick-up modules of the rolling sub-assembly due to the release of the storage volume storage by the absence of the communication required between said RFID chips and the additional storage and communication module.

According to another characteristic, the device allowing for the implementation of the method of the invention is noteworthy in that it comprises an additional means of storing energy that connects to the reception and transmission module. The implementing of the invention does not therefore pass through a measurement module that is added but through additional functionalities added to the conventional data reception and transmission module. In order to implement more precise communication, a means of communication via low frequencies (LF) is provided on the reception and transmission module.

With the fundamental concepts of the invention having been disclosed hereinabove in their most elementary form, other details and characteristics shall appear more clearly when reading the following description and with regards to the annexed drawings, which give by way of a non-limiting example, an embodiment of a system for monitoring in accordance with the invention.

DESCRIPTION OF A PREFERRED EMBODIMENT

Figure 1:
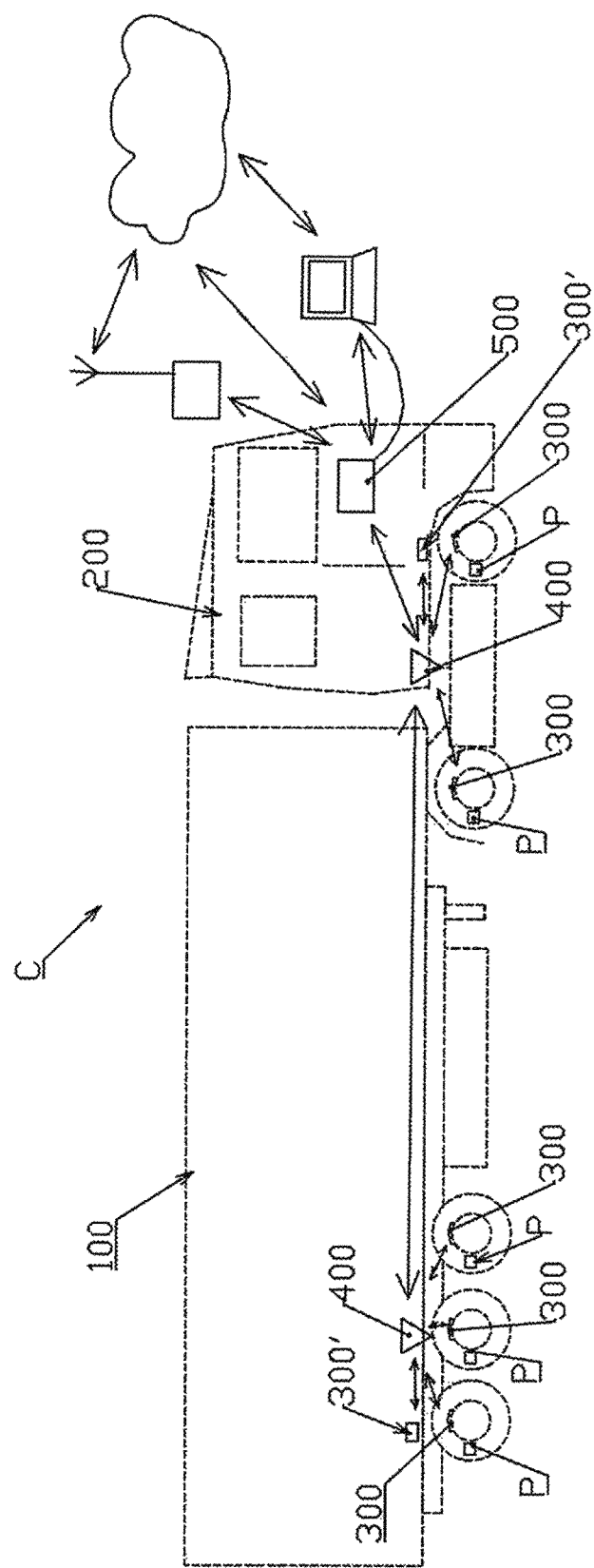
FIG. 1 is a diagrammatical drawing of an embodiment of a system in accordance with the invention.

As shown in the drawing of FIG. 1, the lorry referenced as C as a whole, comprises two rolling sub-assemblies constituted on the one hand, by the trailer 100 and on the other hand, by the tractor 200. The lorry is provided with a system for monitoring the temperature and/or the pressure of the tyres. This system includes the following modules:
measurement pick-up and communication modules 300 present in each tyre of wheel R,
RFID chips referenced as P present in each tyre,
a module present on each rolling sub-assembly 100 and 200, for receiving and transmitting 400 information coming from the measurement pick-up modules 300,
a means of display and management 500 available in the cab for the driver and communicating with said reception and transmission modules 400.

In accordance with the invention, an additional measurement pick-up and communication module 300' is installed on each chassis of rolling sub-assembly. These modules 300' are identical to the modules 300 but implement other functions. As such, in accordance with the invention, the memory of the modules 300' receives, during a learning phase, the set of unique identifiers and associated locations of each measurement module 300 housed in the wheels of the rolling sub-assembly whereon they are installed.

Figure 2:
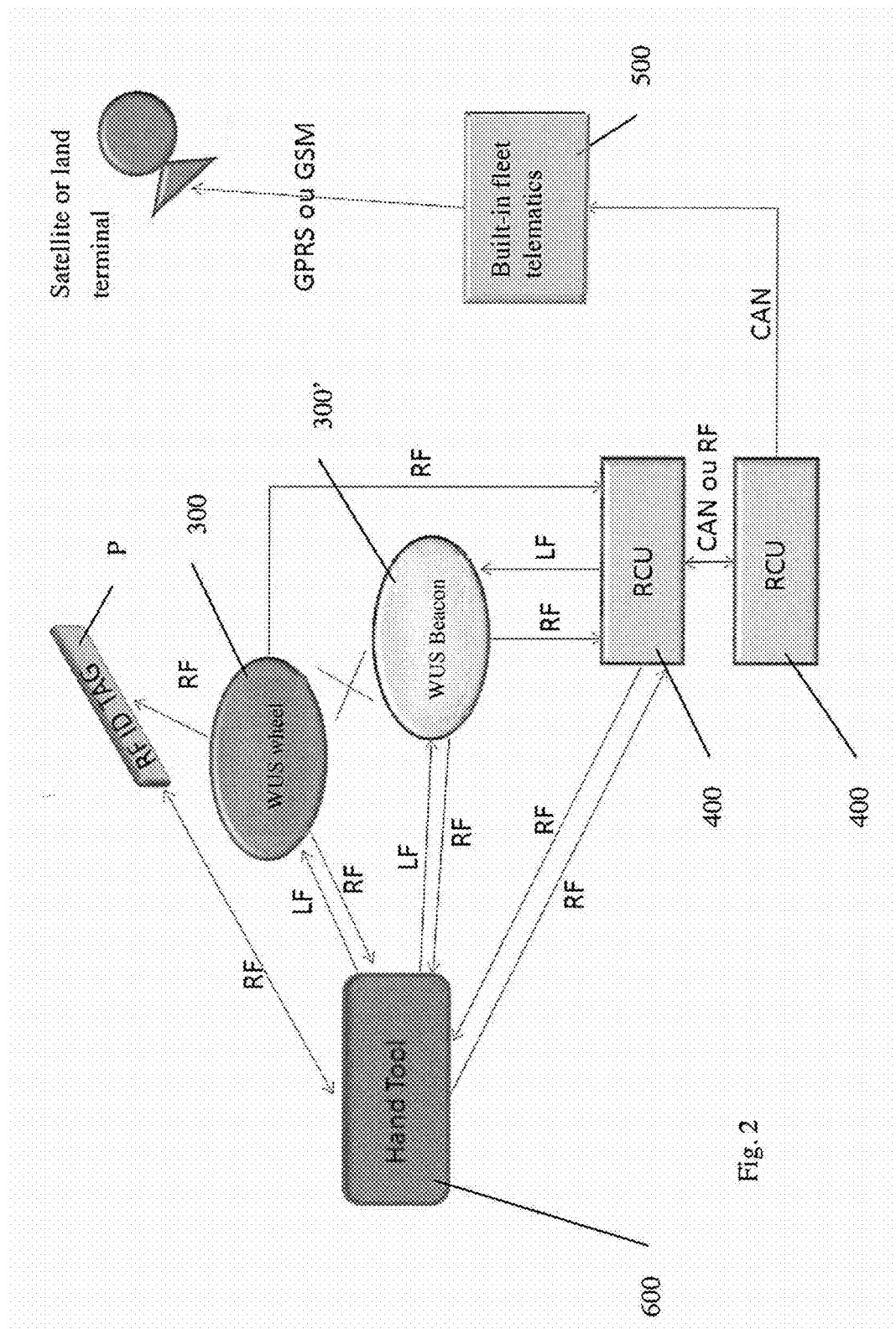
FIG. 2 is a diagrammatical drawing that shows the various communications between the various modules of the system.

As shown in the drawing of FIG. 2 and according to a preferred embodiment, the learning is carried out by means of a portable interrogation module 600 (trigger) that interrogates each measurement module 300 and each chip P of the same rolling assembly. This interrogation can be carried out in low frequencies (LF) and the measurement module can respond in radio frequencies (RF) while it can be carried out in radio frequencies (RF) for the chips that also respond via radio frequencies (RF). As such, the trigger stores in memory the locations of each measurement module 300 on the rolling assembly. Once the tour of the sub-assembly has been carried out, for example the six wheels of the tractor 200, the operator comes within the vicinity of the storage module 300' installed on the tractor 200 and transfers therein in low frequencies (LF) the data of the configuration that the trigger has just learned. The operator then proceeds likewise for each rolling sub-assembly.

As such, each storage and transmission module 300' knows the location and the unique identifier of each measurement module and is able to communicate this information instantaneously to the reception and transmission module 400 in radio frequencies (RF) which, for their part, communicate via the electronic network (CAN) or in radio frequencies with the other reception and transmission modules 400. So that said reception modules 400 can interrogate or activate the storage modules, a means of communication in low frequencies is provided on the reception modules 400. The measurement pick-up modules 300 do not communicate with the measurement module 300'. In addition, only one transmission in radio frequencies (RF) is implemented between the measurement module 300 and the reception and transmission module 400.

It is understood that the method and the device that have just been described and shown hereinabove, have been described and shown for the purpose of a divulgation rather than a limitation. Of course, various arrangements, modifications and improvements can be made to the example hereinabove, without however leaving the scope of the invention.

The invention claimed is:

1. Method for utilizing a system for monitoring pressures and/or temperatures of tires of a vehicle (C) comprising one or more rolling sub-assemblies (100, 200), each of the rolling sub-assemblies having a chassis, axles, and wheels, each wheel having a tire, said system including the following:
measurement pick-up and communication modules (300) associated with each wheel (R) for taking measurements of the pressure and/or of the temperature of the tire of each wheel,
at least one reception and transmission module (400) for information transmitted at radio frequencies (RF) by the measurement pick-up modules and arranged on the axle or the chassis of the vehicle (C), a means of display and management (500) available in the cab for the driver of the vehicle (C) and communicating by wired network or by radio frequencies (RF) with said reception and transmission module or modules (300), wherein the method includes installing on each rolling sub-assembly (100, 200), an additional storage and communication module (300') comprising:

a data storage means in which are recorded, during a learning phase, a set of unique identifiers and the locations of each measurement pick-up and communication module (300) of said rolling sub-assembly (100, 200), a means of communication transmitting in radio frequencies (RF) and receiving in low frequencies (LF) communicating at least with the reception and transmission module or modules (400), a means of storing energy for the purposes of powering the communication means, in such a way that said storage and communication module (300') can retain in memory the set of identifiers and associated locations of the same rolling sub-assembly (100, 200); and communicating the set of identifiers and associated locations so that the set of identifiers and associated locations are readily available to the system.

2. The method according to claim 1, CHARACTERISED IN THAT the method further includes associating to said storage and communication module (300') a means for detecting movement of the rolling sub-assembly (100, 200) for the purposes of triggering the emission of the data stored by the means of communication only once the movement has been detected.

3. The method according to claim 1, CHARACTERISED IN THAT the method further includes comparing, by means of the reception and transmission module (400), the data coming from the measurement modules (300) with the data coming from the means of storage and communication (300').

4. The method according to claim 1, CHARACTERISED IN THAT the method further includes associating with said storage and communication module (300'), a measurement pick-up means for measuring the pressure and/or the temperature.

5. The method according to claim 4, CHARACTERISED IN THAT the method further includes positioning said storage and communication module (300') provided with the measurement pick-up means, outside of the rolling sub-assembly (100, 200) in order to know the temperature of the ambient outside air for the purposes of correction by offsetting the measurements taken in the tires by the measurement pick-up means and storage and communication module (300).

6. The method according to claim 4, wherein at least one of the rolling sub-assemblies has a useful volume, CHARACTERISED IN THAT the method further includes positioning said storage and communication module (300') provided with the measurement pick-up means inside the useful volume of the rolling sub-assembly (100, 200).

7. The method according to claim 1, CHARACTERISED IN THAT the method further includes:

measuring the power of the signal received by the reception and transmission module or modules (400) and sent by the storage and communication modules (300'), and knowing the distance that separates the storage and communication modules (300') and the reception and transmission modules (400), in order to calibrate the intensity of the signal emitted by said reception and transmission module or modules (400) in order to provide the location of the measurement pick-up and communication modules (300) by measuring the intensity of the signal emitted by the communication modules (300).

8. The method according to claim 1, CHARACTERISED IN THAT the method further includes receiving, by means of the reception and transmission module (400), the signals of the storage and communication modules (300') of other rolling sub-assemblies and in emitting an alert on the display and management module (500) in order to prevent any contact.

9. The method according to claim 1, CHARACTERISED IN THAT the method further includes receiving, by means of a reception and transmission module (400), the signals from storage and communication modules (300') associated with fixed structures.

10. The method according to claim 1, CHARACTERISED IN THAT the method further comprises recording for the purposes of identification, in the data storage means, data relative to one or several of the following objects:
rolling sub-assembly (100, 200),
vehicle (C),
user,
owner.

11. The method according to claim 1, CHARACTERISED IN THAT the method further includes recording in the data storage means, data relative to the maintenance, road activity history or data measured.

12. The method according to claim 1, wherein the vehicle is used for transporting merchandise to a final client, and wherein the method further includes recording in the data storage means, a confidential code transmitted to the final client receiving the merchandise.

13. Device adapted for implementing the method according to claim 1, wherein said storage and communication module (300') includes an additional measurement pick-up module (300') grouping together the same functionalities as those of the measurement pick-up modules (300) of the wheels and being fixed to the chassis of the rolling sub-assembly (100, 200).

14. Device adapted for implementing the method according to claim 1, wherein the device comprises an additional means of storing energy that is connected to the reception and transmission module (400).

15. The device according to claim 14, further comprising means for communication in low frequencies is provided on the reception and transmission module (400).

16. A system for monitoring pressures and/or temperatures of tires of a vehicle (C) comprising one or more rolling sub-assemblies (100, 200), each of the rolling sub-assemblies having a chassis, axles, and wheels, each wheel having a tire, said system including the following:

measurement pick-up and communication modules (300) associated with each wheel (R) for taking measurements of the pressure and/or of the temperature of the tire of each wheel, at least one reception and transmission module (400) for information transmitted at radio frequencies (RF) by the measurement pick-up modules and arranged on the axles or the chassis of the vehicle (C), a means of display and management (500) available in the cab for the driver of the vehicle (C) and communicating by wired network or by radio frequencies (RF) with said reception and transmission module or modules (300), wherein the system also includes an additional storage and communication module (300') installed on each rolling sub-assembly (100, 200), the additional storage and communication module (300') comprising:

a data storage means in which are recorded, during a learning phase, a set of unique identifiers and the locations of each measurement pick-up and communication module (300) of said rolling sub-assembly (100, 200), a means of communication transmitting in radio frequencies (RF) and receiving in low frequencies (LF) communicating at least with the reception and transmission module or modules (400), a means of storing energy for the purposes of powering the communication means, in such a way that said storage and communication module (300') can retain in memory the set of identifiers and associated locations of the same rolling sub-assembly (100, 200) and is configured to communicate the set of identifiers and associated locations so that the set of identifiers and associated locations are readily available to the system.

17. The system according to claim 16, further including a means for detecting movement of the rolling sub-assembly (100, 200) for the purposes of triggering the emission of the data stored by the means of communication only once the movement has been detected, said detecting means being associated with said storage and communication module (300').

18. The system according to claim 16, further including a means for measuring the pressure and/or the temperature, said measuring means being associated with said storage and communication module (300'), said storage and communication module being provided with a measurement pick-up means.

19. The system according to claim 18 said storage and communication module (300') provided with the measurement pick-up means, being provided outside of the rolling sub-assembly (100, 200) in order to know the temperature of the ambient outside air for the purposes of correction by offsetting the measurements taken in the tires by the storage and communication modules (300).

20. The system according to claim 16, wherein said storage and communication module (300') is configured to communicate the set of identifiers and associated locations to the means of display and management so that the location of a corresponding one of the tires can be determined for each pressure and/or temperature measurement.

* * * * *